R. H. FOSTER.
LOG LOADING DEVICE.
APPLICATION FILED FEB. 18, 1919
1,317,662
Patented Sept. 30, 1919.
2 SHEETS—SHEET 1.
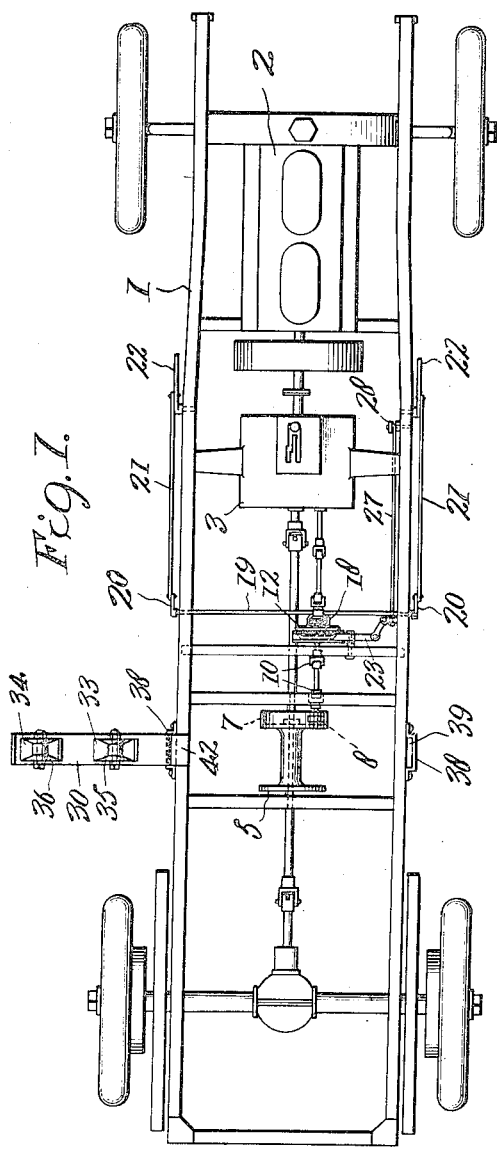
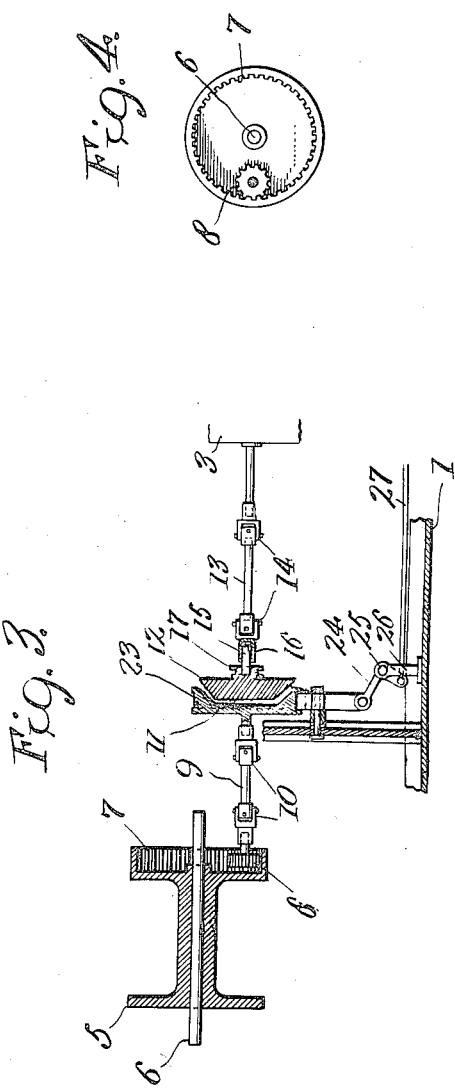
Inventor:
R. H. Foster.
by Wilkinson & Fisher
Attorneys.

R. H. FOSTER.
LOG LOADING DEVICE.
APPLICATION FILED FEB. 18, 1919.
1,317,662.
Patented Sept. 30, 1919.
2 SHEETS—SHEET 2.
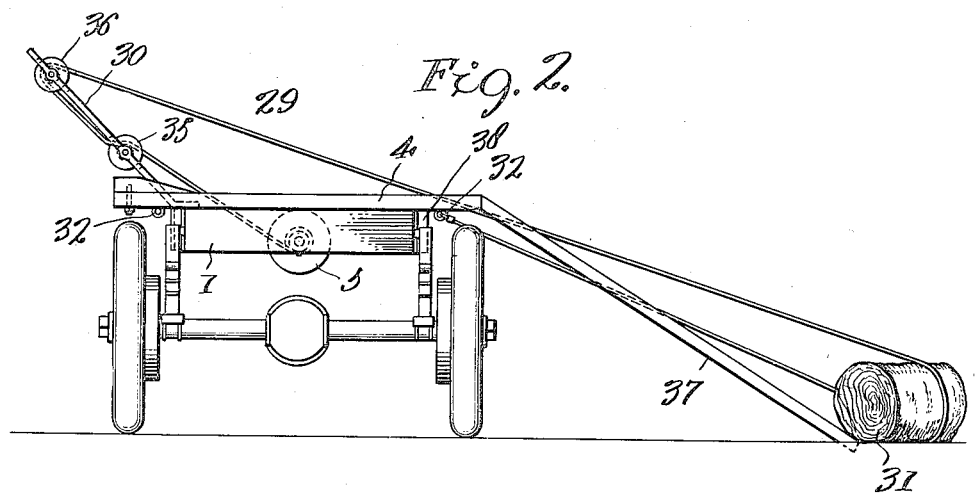
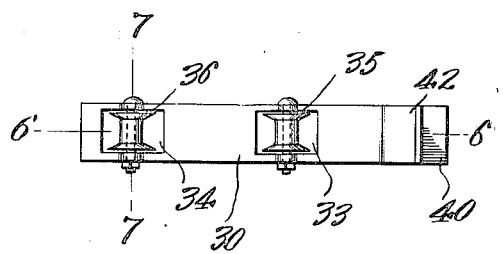
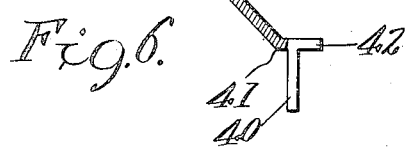
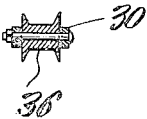
Inventor
R. H. Foster;
by Wilkinson & Giusta.
Attorneys.

__UNITED STATES PATENT OFFICE.__

REGINALD H. FOSTER, OF HOT SPRINGS, ARKANSAS, ASSIGNOR OF ONE-HALF TO JOHN H. PAGE, OF LITTLE ROCK, ARKANSAS.

LOG-LOADING DEVICE.

1,317,662.

Specification of Letters Patent. Patented Sept. 30, 1919.

Application filed February 18, 1919. Serial No. 277,825.

*To all whom it may concern:*

Be it known that I, REGINALD H. FOSTER, a citizen of the United States, residing at Hot Springs, in the county of Garland and State of Arkansas, have invented certain new and useful Improvements in Log-Loading Devices; and I do hereby declare the following to be a full, clear, and exact description of the invention, such as will enable others skilled in the art to which it appertains to make and use the same.

My present invention relates to a log loading device, and it is intended to provide a device of this character for use on motor trucks or like vehicles; one object of the present invention being to provide a device of such a character as will not disturb the present standard construction of automobile trucks, but which may be mounted on a truck of any standard present type of construction without any alteration or modification thereof.

Another object of the present invention resides in providing a log loading device of such a nature and construction that by the use of same I am enabled to load the logs on the truck from either side by a shifting of minimum parts, which may be done quickly and conveniently.

A further object of the invention lies in providing improved driving mechanism for the log loading device that is capable of operation by power derived from the automobile motor through the transmission, and in the provision of further parts and mechanisms whereby I am enabled to connect and disconnect the log loading driving mechanism, and whereby the log loading mechanism may be held against movement when disconnected from the transmission in order to hold the logs at any place on the skids.

It frequently becomes necessary and desirable to readjust the log to the proper angle on the skids while the same is being drawn up upon the truck body, and for this reason a brake device, and a clutch mechanism whereby the log loading device may be disconnected from the driving parts and held against retrograde motion, is found to be of great advantage.

My invention will be more clearly understood after reference to the accompanying drawings, in which like parts are indicated by similar reference symbols throughout the several views, and in which:—

Figure 1 is a top plan view of an automobile truck chassis, with the present improved log loading device applied thereto.

Fig. 2 is a rear end view of an automobile truck shown with the invention applied thereto.

Fig. 3 is an enlarged sectional view with parts shown in elevation of the drum driving mechanism.

Fig. 4 is an end elevational view of the drum showing the internal gear drive.

Fig. 5 is a plan view of the guide bracket.

Fig. 6 is a longitudinal sectional view taken on the line 6—6 in Fig. 5; and

Fig. 7 is a cross sectional view taken on the line 7—7 also in Fig. 5.

Referring more particularly to the drawings, the chassis of an automobile truck is designated generally at 1 in Fig. 1; while 2 indicates the engine or motor installed at the front of the chassis 1 and communicating power in the usual manner through the transmission which is indicated at 3.

In Fig. 2 a truck body or platform is shown at 4, but this platform is omitted in Fig. 1 to more clearly show the present invention.

In accordance with the present invention a drum 5 is mounted at a suitable location beneath the truck platform 4 and is adapted to rotate on an axis which is arranged substantially longitudinally of the chassis 1; in the present instance this drum 5 being shown as rotating on a shaft 6 (see more particularly Fig. 3).

One head of the drum 5 is illustrated clearly in Figs. 3 and 4 is enlarged and formed with an internal gear 7. Meshing with this internal gear 7 is a pinion 8 on a shaft 9, having included therein suitable universal joints 10 which allow of any desired angular relation of the shaft or pinion. The shaft 9 is driven through a clutch 11, 12, of any suitable variety, preferably the two-part cone clutch shown in the present drawings. The element 11 of this clutch is stationary, while the other coöperating element 12 is movable, and means is provided for moving this element 12 into and out of driving engagement with the companion element 11, preferably by mechanism that is capable of operation from either side of the truck.

A shaft 13 drives the movable element 12 of the clutch, said shaft 13 passing to the transmission 3 where it is connected in any desired manner so as to be driven from the motor 2. Suitable universal joints 14 are also coupled in the shaft 13 so as to enable the parts of the shaft to assume different angular positions.

As shown in Fig. 3, the movable element 12 of the cone clutch is provided with a stem 15 slidable in a socket 16, the connection being such that the socket 16 will constantly rotate said stem 15 and to this end these parts may be squared.

Carried with this element 12 of the clutch is a grooved collar 17 arranged to receive the clutch yoke indicated at 18 in Fig. 1, and this clutch yoke is connected to a transverse rock shaft 19 which extends to both sides of the chassis and carries arms 20 which are connected by links 21 to operating levers 22. The arrangement is such that the clutch may be operated from either side of the truck, which avoids the necessity of walking completely around the truck whenever the clutch is to be thrown.

The immovable element 11 of the clutch is formed at its periphery with a brake drum adapted to receive the brake band 23, whereby the drum 5 may be held against motion when the clutch is disconnected. The brake band 23 is connected to one arm of a bell crank lever 24, fulcrumed at 25 on a bracket 26; said bell crank lever 24 being connected for operation to a rod 27 running forwardly and coupled to a lever 28. In the drawings this braking mechanism is shown as capable of operation at only one side of the truck, but it is obvious that a like construction may be mounted at the opposite side of the truck for actuation from either side.

A cable or chain 29 is wound about the drum 5, and after passing through the guide bracket 30 is carried to the log shown at 31 in Fig. 2. This cable 29 is formed into a bight, and the log 31 is engaged in this bight, the free end of the cable being attached as at 32 at a suitable point on the truck platform 55 form 4.

The guide bracket 31 is shown more particularly in Figs. 5, 6 and 7. This guide bracket 30 is made of a flat elongated strip of strong material and is provided with two openings 33 and 34, one of the openings 33 being preferably placed slightly below the center of the bracket 30, while the other opening 34 is made close to the top of same.

In these openings are journaled flanged rollers 35 and 36, respectively, which are provided to receive the cable or chain 29. The method of passing this chain over the guide bracket is shown clearly in Fig. 2, wherein the chain or cable 29 passes upwardly from the drum 5 and first over the flanged roller 35, after which it is carried beneath the guide bracket 30 and up and about the upper roller 36, the chain or cable being brought through the upper opening 34 and from there running in a substantially direct line to the upper part of the log 31. In virtue of this arrangement a direct pull is exerted on the upper part of the log, and as the chain or cable 29 is wound up upon the drum 5 the log 31 will receive a rolling motion up the skids 37.

The guide bracket 30 is capable of attachment at either side of the truck, and for the purpose of readily enabling the transfer to be made, I preferably provide irons 38 at opposite sides of the truck, these irons, as shown in Fig. 1, being provided with pockets 39 therein. These pockets 39 are arranged to receive the vertical stem 40 projecting from the lower parts of the guide bracket 30, and adjoining the upper end of said stem 40 I find it advantageous to provide a shoulder 41 which may rest upon the top edge of the iron 38. I also preferably provide the guide bracket with a flange 42 which extends from the upper end of the stem 40 and is adapted to engage with the top of the truck chassis, platform or other adjacent part.

The shoulder 41 and flange 42 form seats by which any transverse tilting motion of the guide bracket 30 is prevented in either direction, as such an attempted motion would be transmitted by these parts through the stem 40 to the iron 38.

The operation of the invention is substantially as follows:—

The log 31 is first arranged in the bight of the chain or cable 29 as shown in Fig. 2, and this log placed close to the lower ends of the skids 37. The clutch is now connected and the brake band 23 released so that the motor 2 through the transmission 3 may put the drum 5 in motion and wind up the cable or chain 29. As this latter action is accomplished the log 31 will be rolled up the skids 37 and onto the platform 4 of the truck. When the log arrives on the truck it is disconnected from the cable or chain 29 and such cable or chain is again drawn out from the drum 5 and engaged with another log. As soon as each log arrives on the platform, the clutch is disconnected, which enables the operator to draw the chain 29 out from the drum again, which involves reversing the motion of the drum.

If at any time the log 31 assumes an inclined position on the skids 37, such as to interfere with the proper rolling of same up on the platform, the clutch may be at once disconnected and the brake band 23 applied to the clutch member 11, which will bind the drum 5 against motion and prevent the log 31 from rolling back onto the ground, and the parts may be held in this position until the log is again adjusted in a proper position to insure its being rolled in the proper manner onto the truck platform.

When the log is returned to the proper position the brake band 23 is released at the same time reëngaging the clutch. The gear ratio for driving the drum 5 is preferably such that the log will be rolled up the skids at comparatively slow speed, but, of course, any desired gear ratio may be employed.

It will be obvious that I provide an exceedingly practical device for the above explained purpose, which is capable of efficiently handling logs and may be mounted on a truck without requiring any alteration in the structure thereof.

It will be obvious that various modifications might be made in the herein described device, and in the arrangement and combination of parts which could be used without departing from the spirit of my invention; and I do not mean to limit myself to such details except as particularly pointed out in the claims.

Having thus described my invention what I claim and desire to secure by Letters Patent of the United States is:—

1. In combination with a vehicle, irons at both sides of said vehicle providing pockets, a guide bracket, a stem on said guide bracket adapted to fit in either pocket, a shoulder on said guide bracket adapted to fit against said iron, a flange also carried by said guide bracket for fitting against the adjacent part of the vehicle, a cable passing through said guide bracket for drawing the log up in the vehicle, and means for winding up said cable, substantially as described.

2. In combination with a motor vehicle, a drum carried thereby, means whereby the drum may be driven from the vehicle motor, a cable wound about said drum, a guide bracket, a stem on said guide bracket, a shoulder at one side of the upper part of said stem, a flange at the upper part and at the other side of said stem, said guide bracket having openings therein, rollers placed in said openings and adapted to receive the cable from said drum, the end of the cable being attached to a fixed object whereby to form a loop about the log, and pockets at opposite sides of said vehicle to receive said stem, substantially as described.

REGINALD H. FOSTER.

Copies of this patent may be obtained for five cents each, by addressing the "Commissioner of Patents, Washington, D. C."